G. R. GROOT.
Carriage Spring.
No. 92,525.
Patented July 13, 1869.
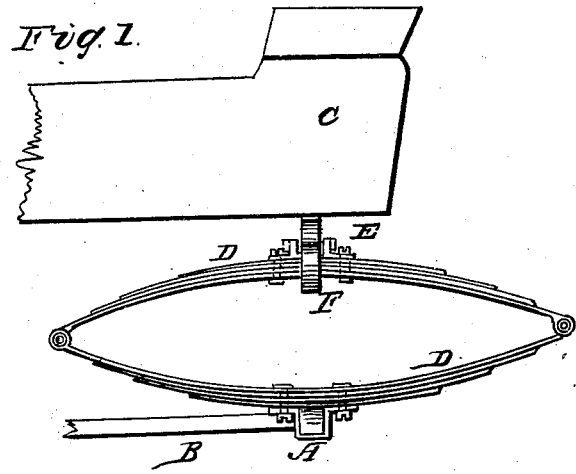
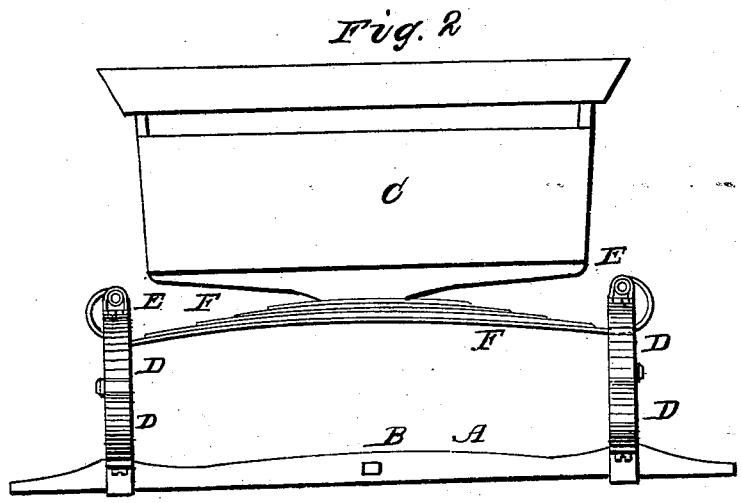

United States Patent Office.

GEORGE R. GROOT, OF CINCINNATI, OHIO.

Letters Patent No. 92,525, dated July 13, 1869.

IMPROVEMENT IN CARRIAGE-SPRINGS.

The Schedule referred to in these Letters Patent and making part of the same.

*To all whom it may concern:*

Be it known that I, GEORGE R. GROOT, of Cincinnati, in the county of Hamilton, and State of Ohio, have invented a new and useful Improvement in Carriage-Springs; and I do hereby declare that the following is a full, clear, and exact description thereof, which will enable others skilled in the art to make and use the same, reference being had to the accompanying drawings, forming part of this specification, in which—

Figure 1 is a side view of the rear part of a wagon to which my improvement has been attached, the wheels being removed.

Figure 2 is a rear view of the same.

Similar letters of reference indicate corresponding parts.

My invention has for its object to improve the construction of the springs of what are known as three-spring carriages, to make them easy-riding, without too much weakening the side or parallel springs; and It consists in the construction and arrangement of the various parts of the spring, as hereinafter more fully described.

A represents the rear axle;

B, the reach; and

C, the body or box of the carriage, about the construction of which parts there is nothing new.

D are the parallel or side elliptic springs, the lower sides or halves of which are secured to the rear axle A, near its ends, in the ordinary manner.

To the upper parts or halves of the elliptic springs D are attached saddle-clips E, which said clips may be placed either above or below the middle part or half of the elliptic springs D, according as the ends of the springs F are made with or without scrolls.

F is a half-elliptic spring, the middle part of which is connected with and supports the rear end of the body or box C.

The ends of the spring F are connected with and suspended by the saddle-clips E, attached to the upper part or half of the side springs D, as before described.

When the ends of the springs F are made with a scroll, they may be passed beneath the upper parts of the springs D, and connected with the saddle-clips E, placed above said parts, as shown in figs. 1 and 2.

By this arrangement of the springs, a three-spring carriage may be made easy-riding, without unduly weakening the side or parallel springs, as they must be weakened, to accomplish this object, when arranged in the ordinary manner.

Having thus described my invention,

I claim as new, and desire to secure by Letters Patent—

The combination of the saddle-clips E and half-elliptic spring F with the side or parallel springs D and body or box C of a three-spring carriage, whether said saddle-clips E be placed above or below the upper parts or halves of the said side springs D, and whether the ends of the said spring F be made with or without scrolls, substantially as herein shown and described, and for the purpose set forth.

GEORGE R. GROOT.

Witnesses:
    I. W. GOZLING,
    JOHN P. MOOREHEAD.